SIGNAL TRANSISTORIZED COMPARATOR CIRCUIT

Filed Aug. 3, 1964

INVENTORS
ROBERT J. MOLNAR
WALTER PARFOMAK

BY
Constantine A. Michalos
ATTORNEY

United States Patent Office 3,363,112

Patented Jan. 9, 1968

3,363,112

SINGLE TRANSISTORIZED COMPARATOR CIRCUIT

Robert J. Molnar, New York, and Walter Parfomak, Brooklyn, N.Y., assignors to The Bendix Corporation, Teterboro, N.J., a corporation of Delaware Filed Aug. 3, 1964, Ser. No. 386,996
9 Claims. (Cl. 307—235)

Figure 1:
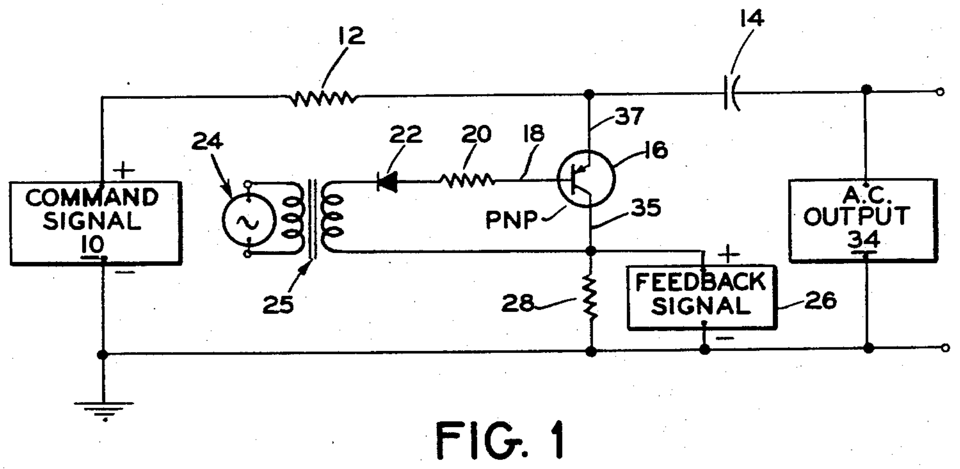

This invention relates to comparators, and particularly to an electronic single transistorized comparator circuit.

Heretofore, the comparators used, commonly needed two circuits each having a transistor. In addition, each transistor circuitry required an isolation transformer and an individual diode for its operation. Usually, the D.C. input to be compared was sent into its individual transistor which was used as a chopper with its output further sent into a primary winding of a transformer. In such prior comparator arrangement, the two D.C. inputs to be compared are connected across the emitter and collector of each of the individual transistor choppers and the chopper A.C. outputs are then fed into two primary windings of an isolation transformer so that the difference between the A.C. outputs is induced in a secondary winding of the isolation transformer for connection across a load.

The disadvantage of this system was in the unbalance of the primary windings of the individual transistor circuitry, within the isolation transformer which would produce errors. In addition errors would be produced by the dissimilar thermal characteristics of the two transistors and the different effect that each output of the transistor would have in the overall circuitry in producing a resultant difference output altered by said errors.

It should be noted that in the hereinbefore mentioned prior comparator circuit, the two D.C. inputs to be compared were compared after their conversion by the transistor choppers into A.C. form. This required a strict control of the phase relationship between the two primary windings of the isolation transformer. Since the current through the primary windings of the isolation transformer compares the difference of the absolute magnitude of the signals to be compared, power dissipation of the transistors would be maximum.

The present invention provides for a simple single transistor circuit which overcomes the errors in the prior comparator arrangement due to the unbalance produced by the two chopper transistors, errors due to the unbalance of the individual primary windings of the isolation transformer energized through the pair of chopper transistors, and errors due to dissimilar thermal characteristics of the two chopper transistors. The use of a single chopper transistor, as in the present invention, thus avoids the thermal changes of a two chopper transistor circuit and resultant errors and thus effects the D.C. inputs to be compared equally, and therefore the resultant difference A.C. output will not be altered.

The present invention provides for the comparison of the two D.C. inputs before the conversion thereof into an A.C. form by a single chopper transistor, and thus eliminating the need for a strict control of the phase relationship needed when two chopper transistors are used as in the prior comparator arrangement. The A.C. phase does not enter into the comparator circuit of the present invention, since the current through the single chopper transistor is proportional to the difference of the D.C. inputs rather than to the absolute magnitudes of the A.C. chopper outputs of the prior two chopper transistor circuitry, the power dissipation of the single transistor is minimized, if the inputs of the comparing signals are of the same polarity. In the present invention both the input D.C. command signal and the A.C. output signal are applied across common input-output lines with no transformer isolation being required.

Therefore, an object of this invention is to provide a comparator for a pair of D.C. signals that has a simple circuitry having a minimum number of parts.

Another object of the present invention is to provide a single transistorized comparator circuit having a solid state form with high accuracy sensing the difference between two D.C. signals to be compared.

Another object of the present invention is to provide a novel solid state comparator or null detector circuit, using for its operation lower voltage and current than is required for other comparators hereinbefore provided.

An additional object of this invention is to provide a single chopper transistor serially connected with a summation resistor and operable to receive a pair of D.C. input signals from two sources of potential, one of said D.C. signals being applied across the summation resistor, and the other of said D.C. signals being connected across the serially connected chopper transistor and resistor, with the chopper transistor providing a switching means for periodically connecting the sources of potential in opposing relation across the summation resistor, with the summation resistor being responsive to the closing of the switching means to compare the magnitude of the sources of potential and apply an A.C. output through the chopper transistor of a phase dependent upon the sense of the difference between said D.C. signals and of an amplitude dependent upon the magnitude of the difference in said D.C. signals.

These and other objects and features of the invention are pointed out in the following description in terms of the embodiments thereof which are shown in the accompanying drawing. It is to be understood, however, that the drawing is for the purpose of illustration only and is not a definition of the limits of the invention, reference being had to the appended claims for this purpose.

Figure 2:
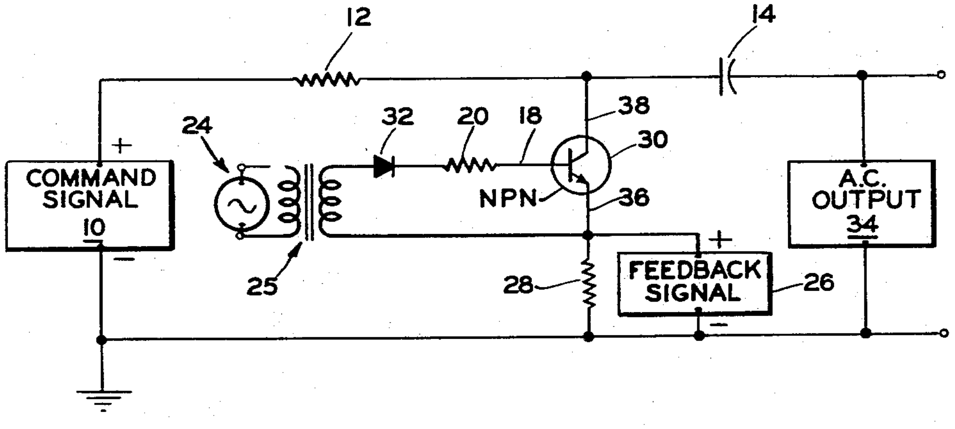

In the drawings:

FIGURE 1 shows an electronic circuit diagram of the comparator in one embodiment of the invention; and FIGURE 2 is an electronic circuit diagram of the comparator in accordance with another embodiment of the invention.

Referring now particularly to FIGURE 1 of the electronic comparator circuitry of the drawing in detail, it will be seen that a first variable source of potential 10, which may be a sensor such as a thermocouple, provides a variable DC voltage in relation to a sensed parameter. The variable potential source 10 is connected in series with a resistor 12, which in turn is connected to a capacitor 14 and a PNP type transistor 16. Connecting the base lead 18 of the transistor 16 is a limiting resistor 20 and a rectifying diode 22. The limiting resistor 20 and rectifying diode 22 are interposed between the transistor 16 and an AC reference voltage source 24 which may apply through a coupling transformer 25 an AC voltage of about 10 volts magnitude. As provided in FIGURE 1, the use of the diode 22 permits only negative voltage pulses to go through it to impinge on the base lead 18 of the PNP transistor 16. Therefore, the diode 22 is used to block the positive pulses of the reference voltage signal from the transistor 16 while permitting the negative pulses to be applied to the base of the transistor 16 to render the transistor 16 effective as a switching means.

The PNP transistor used in this circuitry provides for a lower saturation resistance and therefore a more perfect switching. In addition, it should be noted that the comparator circuit includes a second variable source of potential 26 which may be the output voltage from a summation resistor or the feedback signal source 26 may be of a type including a summation resistor network such as shown and described in a copending U.S. application Serial No. 535,745, filed March 21, 1966, by Robert J. Molnar and Walter Parfomak with reference to FIG- URES 6 and 7 thereof and applied through a conductor 334 to the comparator circuit of FIGURE 5 of the U.S. application Ser. No. 535,745, or there may be utilized any suitable feedback source of voltage to be compared by the comparator. Thus there is provided a comparator that can be used by a null detector or a DC servo system or any other null indicating instrument where the source of potential 10 is a command signal voltage and the source of potential 26 is a proportional feedback signal voltage. The command signal source 10 may be a condition sensor of a type indicated at 210 of FIGURES 1 and 5 of the aforenoted copending U.S. application Ser. No. 535,745.

In the operation of the system shown in FIGURE 1, a feedback voltage is applied to a collector lead 35 of the PNP transistor 16. As an example, this voltage may be an estimate voltage to be compared with the input voltage 10 developed in the circuitry at an emitter lead 37 of the PNP transistor 16. The transistor 16 senses the difference of these two signals and then converts the difference into an AC output applied to a suitable load or output circuit 34. The output circuit 34 may be a suitable electronic drive circuitry such as shown in a copending U.S. application Ser. No. 400,534, filed Sept. 30, 1964, by Robert J. Molnar and Walter Parfomak and in somewhat greater detail in FIGURE 5 of the aforenoted copending U.S. application Ser. No. 535,745, both of which applications have been assigned to The Bendix Corporation, the same assignee as the present invention.

It should be noted that if there is no difference between the two DC sources of potential, the command signal source 10 and the feedback signal source 26, there will be no output and therefore the comparator will be situated in the null position. At this point, the reference AC voltage source 24 will continue to apply an AC voltage to the transistor for effectively switching the transistor off and on in the manner of a switch opening and closing its contacts.

Referring to FIGURE 2, it will be seen that the first variable source of potential 10 may be a sensor such as a thermocouple for providing a variable DC voltage in relationship to the sensed parameter. The variable potential 10 is connected in series with the resistor 12, which in turn is connected to the capacitor 14 and an NPN type transistor 30. Connecting the base lead 18 of the transistor 30 is the limiting resistor 20 and a rectifying diode 32. The limiting resistor 20 and rectifying diode 32 are interposed between the transistor 30 and an AC reference voltage source 24 which may apply through a coupling transformer 25 an AC voltage of about 10 volts magnitude. As provided in FIGURE 2, the the use of the diode 32 permits only positive voltage pulses to go through it to impinge on the base lead 18 of the NPN transistor 30. Therefore, the diode 32 is used to block the negative pulses of the reference voltage signal from the transistor 30 while permitting the positive pulses to be applied to the base of the transistor 30 to render the transistor 30 effective as a switching means.

It should be noted that the comparator circuit made up of the second variable source of potential 26 which may be the output voltage from a summation resistor or any feedback source of voltage to be compared by the comparator. Thus, there is provided a comparator that can be used by a null detector or a DC servo system or any other null indicating instrument where the source of potential 10 is a command signal voltage and the source of potential 26 is a proportional feedback signal voltage, as in the first embodiment.

Both circuits provide for an AC output 34 which is produced after the comparison of the two signals thereby reducing the need for a strict control of the phase relationship between the two potentials and thus avoid the error that may be produced by comparing the signals after the conversion into the AC form. The coupling capacitor 14 used in both circuits block the DC from entering the load while permitting the passage of AC current.

In the operation of the system a feedback voltage is applied to the emitter lead 36 of the transistors. As an example, this voltage may be an estimate voltage to be compared with the input voltage 10 developed in the circuitry at the collector lead 38 of the transistor. The transistor 16 senses the difference of these two signals and then converts the difference into an AC output applied to a suitable load or output circuit 34. This output circuit may be suitable circuitry such as shown in the copending U.S. application Ser. No. 535,745, filed Mar. 21, 1966, by Molnar et al. and assigned to the Bendix Corporation, the same assignee as the present application.

It should be noted that if there is no difference between the two DC sources of potential 10 and 26, there will be no output and therefore the comparator will be situated in the null position. At this point, the reference AC voltage source 24 will continue to apply an AC voltage to the transistors 16 or 30 for effectively switching the transistor off and on in the manner of a switch opening and closing its contacts.

Basically, it would have been necessary to have two transistors to compare the inputs, which need the isolation of the two inputs with two transformers and then to compare these inputs. In this invention, this is done all at once in respect to the same ground and thus is more simple, accurate and efficient as hereinbefore described.

In the use of this comparator with the circuitry of the copending U.S. application Ser. No. 535,745, the comparator can be used as a means of comparing and directing signals to the circuitry as more fully described in said copending application.

While two embodiments of the invention have been illustrated and described, various changes in the form and relative arrangement of the parts, which will now appear to those skilled in the art may be made without departing from the scope of the invention. Reference is, therefore, to be had to the appended claims for a definition of the limits of the invention.

What is claimed is:

1. A comparator comprising a first continuously variable source of direct current potential to provide a first signal, a second continuously variable source of direct current potential to provide a second signal, switch means for connecting said first source of potential to said second source of potential, means for periodically closing said switch means, and summation means responsive to said switch means being periodically closed for providing an output signal having a magnitude proportional to a difference in potential between said first and second signal sources and of a phase corresponding to a polarity of said difference in potential.

2. A comparator comprising a first continuously variable source of D.C. potential to provide a first signal, a second continuously variable source of D.C. potential to provide a second signal, a switching means interposed between said first source of potential and said second source of potential, means to operate said switching means for periodically closing a connection between said first source of D.C. potential and said second source of D.C. potential, and means for algebraically summing said first and second signals and responsive to the closing of said switching means for thereby providing an output signal having a magnitude proportional to a predetermined difference between said first source and said second source of D.C. potential, said summing means effecting a null output signal upon a predetermined relation between the potential of said first source of D.C. potential and said second source of D.C. potential.

3. An electronic comparator circuit comprising a first continuously variable source of D.C. potential to provide a first signal, a second continuously variable source of D.C. potential to provide a second signal, a transistor having a base, a collector and an emitter, said base and emitter being connected between said first and said second variable sources of D.C. potential, means operably connecting the base of said transistor for periodically closing said transistor, and summation means responsive to the closing of said transistor for providing an A.C. signal at an output of said collector and emitter having a magnitude proportional to a predetermined difference in potential between said first and said second sources of potential and a phase corresponding to the polarity of the source providing the greater potential in said difference of potential.

4. An electronic null detector comprising a sensor for sensing a variable parameter, said sensor operable to provide a D.C. potential continuously variable with the sensed parameter, another source of a continuously variable D.C. potential, a transistor having collector, emitter and base elements with one of said elements other than the base element being connected for receiving the variable D.C. potential from said sensor and the other element other than the base element being connected for receiving the variable D.C. potential from said other source, means operably connected to the base element for periodically switching said transistor in an off and an on condition, and summation resistor means responsive to said transistor being periodically in the off and on condition for providing at said elements other than the base element an A.C. voltage signal having a magnitude proportional to a predetermined difference in potential between said sensor D.C. potential and said other D.C. potential.

5. An electronic null detector comprising a sensor for sensing a parameter and for converting said parameter into a first signal corresponding to a variable D.C. potential continosly variable with the sensed parameter, another source of a continuously variable D.C. potential, a PNP type transistor having emitter, collector and base elements interposed between said sources of D.C. potential, means for connecting said sources to the emitter and the collector elements, said connecting means including a summation resistor connected across one of said sources of D.C. potential, the summation resistor being connected in series with the emitter and collector elements of the transistor and therethrough across the other of said sources of D.C. potential, a source of A.C. reference voltage, a diode interposed between said A.C. reference voltage and the base element of said transistor, said diode being operable to present the negative voltage of said A.C. reference voltage to said base element while rejecting the positive pulses of the A.C. reference voltage, thereby permitting said transistor to operate as a switch means for comparing said sensor variable source of D.C. potential with said other variable source of D.C. potential and applying an alternating current output signal across said emitter and collector elements having a magnitude proportional to an instantaneous difference in potential between said sources of variable D.C. potential, and said alternating current output signal having a phase depending upon the variable D.C. source of greater potential.

6. An electronic null detector comprising a sensor for sensing a variable parameter, said sensor operable to produce a D.C. potential continuously variable with the sensed parameter, another source of a variable D.C. potential, a transistor having collector, emitter and base elements with one of said elements other than the base element being connected for receiving the variable D.C. potential from said sensor and the other element other than the base element being connected for receiving a variable D.C. potential from said other source, a source of A.C. reference voltage, means operably connecting said source of A.C. reference voltage to the base element for periodically switching said transistor in an off and an on condition, and summation resistor means responsive to said transistor being periodically in the off and on condition for providing at said elements other than the base element an A.C. voltage signal having a magnitude proportional to a predetermined difference in potential between said sensor variable D.C. potential and said other variable D.C. potential, and said A.C. voltage signal having a phase depending upon the greater variable D.C. potential.

7. An electronic null detector comprising a sensor for sensing a parameter and for converting said parameter into a first signal corresponding to a continuously variable D.C. potential dependent upon the sensed parameter, another continuously variable source of D.C. potential, an NPN type transistor having emitter, collector and base elements interposed between said sources of D.C. potential, means for connecting said sources to the emitter and the collector elements, said connecting means including a summation resistor connected across one of said sources of D.C. potential, the summation resistor being connected in series with the emitter and collector elements of the transistor and therethrough across the other of said sources of D.C. potential, a source of A.C. reference voltage, a diode interposed between said A.C. reference voltage and the base element of said transistor, said diode being operable to present the positive voltage of said A.C. reference voltage to said base element while rejecting the negative pulses of the A.C. reference voltage, thereby permitting said transistor to operate as a switch means for comparing said sensor variable source of D.C. potential with said other continuously variable source of D.C. potential and applying an alternating current output signal across said emitter and collector elements having a magnitude proportional to a difference in potential between said sources of variable D.C. potential, and said alternating current output signal having a phase dependent upon the variable D.C. source of greater potential.

8. A comparator for comparing a first continuously variable source of D.C. potential corresponding to a command signal and a second continuously variable source of D.C. potential corresponding to another signal, said comparator comprising a transistor having an emitter element, a collector element, and a base element, the first variable source of D.C. potential being connected to the collector of said transistor, the second variable source of D.C. potential being connected to the emitter element of said transistor, a source of A.C. reference voltage, a diode connecting said A.C. reference voltage with the base of said transistor in such a manner as to cause the A.C. reference voltage to periodically close said transistor for detecting and comparing said two continously variable potentials corresponding to the command and other signals to provide an output signal proportional to a difference in potential between said two continuously variable sources of D.C. potential.

9. A comparator for comparing a first continuously variable source of D.C. potential corresponding to a command signal and a second continuously variable source of D.C. potential corresponding to another signal, said comparator comprising a transistor having an emitter element, a collector element, and a base element, the first variable source of D.C. potential being connected to the emitter of said transistor, and the second source of D.C. potential being connected to the collector of said transistor, a source of A.C. reference voltage, a diode connecting said A.C. reference voltage with the base of said transistor in such a manner as to cause the A.C. reference voltage to periodically close said transistor for detecting and comparing said two continuously variable potentials corresponding to the command and other signals to provide an output signal proportional to a difference in potential between said two continuously variable sources of D.C. potential.

References Cited

UNITED STATES PATENTS 3,003,122 10/1961 Gerhard ---------- 307—88.5 X

ARTHUR GAUSS, *Primary Examiner.*

D. D. FORRER, *Assistant Examiner.*